Nov. 20, 1962    F. ARCAMONE ETAL    3,065,147
FERMENTATIVE PRODUCTION AND RECOVERY OF AN ANTIBIOTIC
Filed March 29, 1960
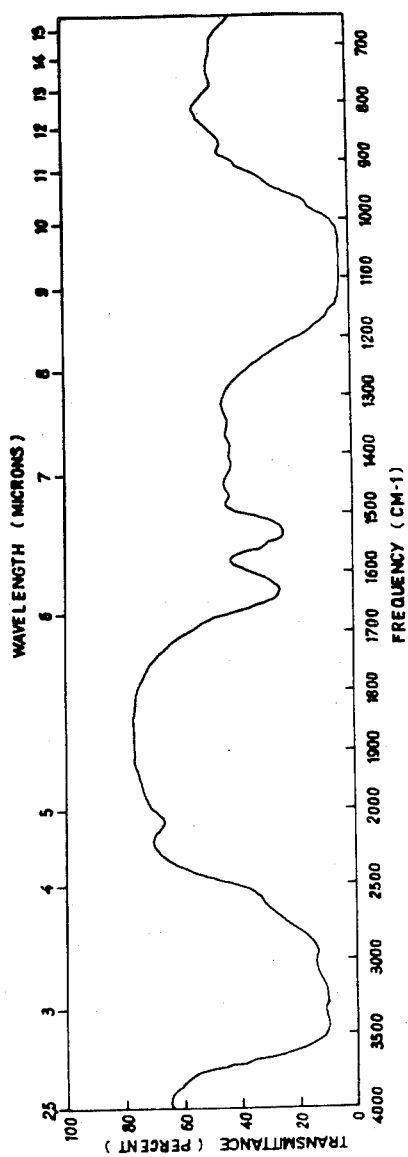

3,065,147
FERMENTATIVE PRODUCTION AND RECOVERY
OF AN ANTIBIOTIC
Federico Arcamone, Cesare Bertazzoli, Mario Ghione, and Tullio Scotti, Milan, Italy, assignors to Societa Farmaceutici Italia, Milan, Italy, a corporation of Italy
Filed Mar. 29, 1960, Ser. No. 18,371
Claims priority, application Great Britain Mar. 31, 1959
11 Claims. (Cl. 195—80)

The present invention relates to a new and therapeutically useful broad spectrum antibiotic product, to its production by fermentation and a process for its recovery.

We have discovered that, using a new species of streptomyces, a high concentration of a new antibiotic substance is formed in a fermentation broth, that this product can be recovered under advantageous process conditions described hereinafter, and further that this substance has properties which mark it as a new and useful therapeutic product.

The new antibiotic provided by the present invention is designated by us as F.I. 1600, or aminosydin, and we include in our invention the free base or its salts, and solutions thereof.

The new organism which permits the production of the antibiotic F.I. 1600 is designated by us as *Streptomyces krestomyceticus* (n. sp.). *Streptomyces krestomyceticus* has been deposited with the National Collection of Industrial Bacteria and has received the index number of N.C.I.B. 8995. *S. krestomyceticus* has also been deposited at the Commonwealth Mycological Institute under the Number 79589, and at the Institute of Microbiology of the Rutgers University, under the No. 3835. The process of the present invention therefore is one for producing the antibiotic substance F.I. 1600 by the cultivation of *Streptomyces krestomyceticus*, N.C.I.B. 8995 and Commonwealth Mycological Institute No. 79589, as herein described, in an aqueous, nutrient medium containing a source of carbon, nitrogen and mineral salts under aerobic conditions until substantial anti-bacterial activity is imparted to the medium and then recovering F.I. 1600 from the medium.

The strain *Streptomyces krestomyceticus* has been found in a soil sample obtained at Massa Marittima (Grosseto), isolated and grown on synthetic as well as organic media within the range of 28–37° C. Under the electron microscope *S. krestomyceticus* shows smooth spores rather regular, cylindrical or oval in shape, somewhat transparent. The hyphae are usually straight but sometimes hooks and spirals are observed.

The approximate range of diameter of the spores is of between $0.3$–$0.4\mu$ to $0.6$–$0.8\mu$.

The strain of *S. krestomyceticus* has been investigated with a view to its classification. Table I sets forth its cultural characteristics.

TABLE I

Agar glycerin glycine: Good growth colorless with abundant production of spores. Aerial hyphae and spores white.
Soil-extract agar: Good colorless growth, covered with moderate formation of whitish aerial mycelium.
Czapek agar: Colorless growth very superficial. Good white sporulation.
Peptone and salts agar: Good growth, colorless to yellowish, with good white sporulation; very short hyphae.
Glycerin agar: Bulky nearly colorless growth; scarce formation of aerial mycelium.
Asparagine dextrose agar: Yellowish small colonies, opaque, flat and waxy, not very evident, without aerial mycelium.
Potato dextrose agar: Not very voluminous colorless growth with scarce whitish aerial mycelium. Typical concentric splits or crackings on the bottom of the culture slants.
Casein hydrolysate agar, supplemented with salts and aminoacids: Small scanty colorless growth. No aerial mycelium.
Potato plugs: Excellent growth throughout the plug, completely covered with abundant aerial mycelium well sporulated.
Emerson's agar: Yellowish growth with undulated surface showing many splits. The whole surface is covered by a very short whitish aerial mycelium more evident where the growth is thicker.
Casein hydrolysate agar: Very abundant and thick growth not very deep into substrate. Evident splits with reverse rims. Uniformly distributed short aerial mycelium but evident. The reverse is sharp yellow.
Soyabean meal agar: Undulated growth with splits. Yellowish vegetative mycelium covered by a very short whitish aerial mycelium.
Soyabean meal glycerin agar: Flat, opaque and brownish colonies with very short aerial mycelium on the bottom of the slants.
Corn steep agar: Similar to soyabean meal agar.
Peptone corn steep agar: Flat and yellowish growth with few splits. Short aerial mycelium, abundant, more evident on the borders of the culture.
Anderson's sporulation medium: Yellowish growth generally flat, showing splits where the agar is thicker. Some aerial mycelium on the folds.
Tryptone agar: Similar to the Anderson's medium, but with colorless vegetative mycelium; abundant aerial mycelium.
Pridham's medium with starch and inorganic salts: Flat yellowish colonies which are more wrinkled where the substrate is thicker.
Oats meal agar: Flat yellowish colonies with colorless borders. Aerial mycelium generally absent, which only appears occasionally on some folds.
Sabouraud agar: Good colorless or cream-colored growth, covered by an abundant white aerial mycelium.
Yeast broth: Superficial bulky and yellowish growth covered with white aerial mycelium.

*S. krestomyceticus* hydrolyses both starch and gelatin, and decomposes tyrosine within 6 days.

Acids are produced using the following substances as sole source of carbon: inulin, threalose, levulose, sorbitol, mannose, gelactose, lactose, adonitol, mannitol, maltose, glycerol, dextrose, dextrin.

Milk is only slightly coagulated after 13 days. Neutral reaction, no peptonization.

The cultural characteristics of the F.I. 1600 producing strain have been compared with those of species already described.

Among these species, *S. virgatus* and *S. flocculus* differ from our strain because their vegetative mycelium is greenish and the former also produces a brown pigment on some media. Besides *S. flocculus* has its surface covered by a velvety or cottony aerial mycelium.

*S. thermophilus* presents a deep growth into the medium and a whitish aerial mycelium.

Further it has a growth optimum at 50° C. The F.I. 1600 producing strain shows a very good growth at 37° C. but very small amounts of antibiotic are produced at 33° C. or somewhat higher.

*S. kanamyceticus* shows a deep growth into the substrate and sometimes greenish or rosy shades in the vegetative mycelium. Sometimes it also produces a brown pigment. No one of the aforesaid species show the typical splits on the surface of the culture, which are the most peculiar characteristics of the F.I. 1600 producing strain. On the basis of those characteristics, which do not correspond to those of any known species, *S. krestomyceticus* is considered a new species. The production of the antibiotic F.I. 1600 has been carried out by fermentation in submerged aerial cultures in an aqueous nutrient solution containing a source of nitrogen, a source of carbon and mineral salts.

As a nitrogen source, the best results are obtained by using protein containing material such as barley malt extract, corn malt extract, corn steep liquor, enzymatic casein hydrolysate, peanut meal, soyabean meal, cotton bean meal, meat extract.

As a source of assimilable nitrogen the inorganic ammonium salts are suitable. Among these are ammonium sulfate and ammonium phosphate. It is also possible to use organic sources of nitrogen such as the amino acids and various proteinaceous natural materials.

The carbon source may be either a soluble carbohydrate such as dextrose or an insoluble one such as starch, for example corn starch. A good yield of antibiotic is obtained also with maltose, dextrin, lactose and other sugars. The mineral salts which are necessary for the fermentation medium are preferably phosphates, which may be present either as ammonium phosphate or as metallic phosphate such as potassium phosphate, chlorides such as NaCl and sulfates such as ammonium or magnesium sulfate.

Suitable buffering agents are calcium carbonate and salts of organic acids such as citrates, acetates and lactates which are useful in maintaining the pH within the proper range.

It is necessary, sometimes, to provide a source of heavy metals which may be present as impurities or added; among these are copper, zinc, manganese, iron and chromium.

The use of a defoaming agent is desirable in large scale fermentors, even though in this fermentation foaming is not a particularly difficult problem and is readily controlled by the use of conventional defoaming agents such as octadecanol in lard oil or other suitable commercial defoamers such as silicones.

The relative ratio of the fermentation medium ingredients has been qualitatively established as follows:

| | Percent |
|---|---|
| Nitrogen source | 0.5–4 |
| Carbon source | 1–5 |
| Phosphates | 0.01–0.3 |
| Sulfates | 0.05–0.25 |
| $CaCO_3$ | 0.1–0.7 |
| Chlorides | 0.1–0.3 |
| Trace elements | 0.0001–0.0005 |

The exact amounts of all the substances are particularly indicated in the examples. The fermentation is carried out at a temperature of from 24° C. to 32° C. for a period of from two days to one week at a pH of 6.3–7.8. The initial pH which ensures the most favorable fermentation process is 6.4–6.7; it increases to 7.6–7.8 towards the end of the fermentation.

Aeration is also necessary for a good yield. The ratio between the amount of air which must be introduced into the fermentation tank and the volume of the culture liquid varies through the fermentation phases between 0.1 and 0.8.

F.I. 1600 may be recovered as a hydrochloride as well as a sulfate from the fermentation broth, by adopting a recovery process which we have devised, which has proved to be highly effective from the standpoint of recovering a product free of inactive impurities, and of other antibiotic substances simultaneously formed in the broth. This method is exemplified below. Basically, it involves the following steps:

(*a*) Precipitation of $Ca^{++}$ of the buffer with oxalic acid and filtration of mycelium and calcium oxalate after adjusting the pH to 7–7.5. When other buffers are used, other precipitants are employed.

(*b*) Absorption of the antibiotic on a cationic exchange resin and elution with dilute acids, such as 1 N HCl. Suitable cationic exchange resins are: IRC 50, IRC 120, Dowex 50, Kastel C 100, Kastel C 300.

(*c*) Neutralization of the eluted solution with an anionic exchange resin, in hydroxylate phase, until the pH rises up to 7–7.5 and subsequently filtering. Suitable anionic exchange resins are: IRA 400, IR 45, Dowex 3, Kastel A 300.

(*d*) Concentration of the filtered solution to dryness under vacuum.

(*e*) Dissolution of the antibiotic in a suitable organic solvent, such as methanol.

(*f*) Precipitation of the F.I. 1600 hydrochloride by addition of acetone to the organic solution.

(*g*) The filtered F.I. 1600 hydrochloride is dissolved in water and the aqueous filtered solution, after concentration to a small volume under vacuum, is treated with triethylamine sulfate. After filtering, the solution is added to methanol with stirring. The F.I. 1600 sulfate is filtered, washed with methanol and dried in vacuo over $P_2O_5$ at 50° C.

It has been found that the antibiotic F.I. 1600 can also be recovered by absorption and elution from carbon. More specifically, we have found that F.I. 1600 may be removed either from its aqueous solutions or from cultural broths by means of carbon, preferably at a pH higher than 7.

F.I. 1600 may be eluted from carbon either by means of aqueous solution or alcoholic solutions of inorganic or organic acids.

F.I. 1600 free base may be obtained by known means, i.e. from its inorganic or organic salts by forcing its solution through an anionic exchange resin, in hydroxylate phase, concentrating the aqueous effluent and isolating the free base by adding acetone.

F.I. 1600 is a basic substance and is water soluble.

F.I. 1600 in the form of the sulfate or hydrochloride, is a white powder, soluble in water and insoluble in almost all organic solvents. The F.I. 1600 hydrochloride is soluble in methanol.

The ultraviolet spectrum of F.I. 1600 free base as well as the one of its inorganic salts shows no absorption within the range of 220–400 μm.

Infrared spectrum of the F.I. 1600 sulfate in KBr (5%), which is reported in the accompanying drawing, shows pronounced peaks at 2.94μ, 3.41μ, 6.15μ, 6.55μ, 9.00μ, and 9.52μ, weak bands at 6.82μ, 7.08μ, 7.28μ, 7.46μ, 10.70μ, 11.17μ, 11.62μ, 13.08μ and inflections at 3.09μ and 10.23μ attributed to the following groups: OH, NH, CH, $CH_2$, $NH_3^+$ ion, C—O—C.

There is no evidence of carbonyl groups in keto, amide or ester form.

The optical rotations of highly pure F.I. 1600, hydrochloride and sulfate in water are:

Hydrochloride: $(\alpha)_D^{25°} = +55°$ (c.=1% in water)

Sulfate: $(\alpha)_D^{20°} = +51°$ (c.=1% in water)

Table II sets forth the elementary analysis of the F.I. 1600 salts.

TABLE II

| F.I. 1600 salts | C, percent | H, percent | N, percent | S, percent | Cl, percent |
|---|---|---|---|---|---|
| Hydrochloride | 33.79 | 6.76 | 8.17 | --- | 21.05 |
| Sulfate | 30.57–30.8 | 6.44–7.00 | 7.19–7.38 | 8.99–9.08 | --- |
| p.(p.Hydroxy-phenylazo)-benzene-sulfonate | 58.58 | 5.25 | 10.27 | 7.72 | --- |
| Helianthine salt | 51.29 | 6.20 | 12.23 | 7.50 | --- |

By analysis of F.I. 1600 sulfate and its degradation products it has been determined that F.I. 1600 has the empirical formula $C_{23}H_{45}N_5O_{14}$, and that of the sulfate should be $C_{23}H_{45}N_5O_{14} \cdot 2.5H_2SO_4 \cdot 2H_2O$ (calculated: C, 30.80; H, 6.03; N, 7.81; S, 8.93). F.I. 1600 gives penta-acyl derivatives by acylation. In this way penta-benzoyl- and penta-acetyl-derivatives have been obtained. It has been found that one mole of penta-acetyl-F.I. 1600, in 0.02 M periodate solution, consumes 2.95 mols of periodate at room temperature.

On the basis of elementary analysis, the basic properties of the product, the fact that all the nitrogen is basic, its U.V. and I.R. spectra, we exclude any polypeptide type structure and we attribute to F.I. 1600 a structure similar to that one of the group of oligosaccharide basic water soluble antibiotics, such as streptomycin and neomycin.

Chromatographically, F.I. 1600 may be distinguished from streptomycin, dihydrostreptomycin, neomycin, viomycin and other glycopeptidic basic substances such as streptothricin and the geomycins.

Prolonged acid hydrolysis of neomycins or of catenulin (J. W. Davisson et al., Antibiot. and Chem. 2, 1952, p. 460) yields a microbiologically active fragment, identified by paper chromatography as neamine.

Acid hydrolysis of F.I. 1600 with 6 N HCl yields no active fragment.

Table III shows the differences between F.I. 1600 and the other antibiotics of the same group.

of F.I. 1600 sulfate inhibiting the growth of the microorganisms listed below in yeast-extract broth.

TABLE IV

| Test organism | After 24 hours of incubation | After 48 hours of incubation |
|---|---|---|
| M. pyogenes aureus | 1 | 1 |
| B. subtilis | 1 | 1 |
| S. faecalis | 1 | 1 |
| Mycobacterium 607 | 1 | 5 |
| M. phlei | 1 | 5 |
| A. bostromi A | 1 | 1 |
| E. coli | 5 | 5 |
| K. friedländeri | 5 | 25 |
| P. vulgaris | 25 | 25 |
| P. aeruginosa | 100 | >100 |
| S. xe)neri Y | 25 | 25 |
| O. albicans | >100 | >100 |
| G. graphii | >100 | >100 |
| T. mentagrophytes | >100 | >100 |

The same concentrations of the antibiotic inhibit the growth of M. tbc. or M. 607 and that of many antibiotic resistant strains of the same species (see Table V).

TABLE III

| Antibiotic | Organism | Analysis of the sulfate | $(\alpha)_D$ of the sulfate | Other properties and differences |
|---|---|---|---|---|
| F.I. 1600 sulfate | Strept. krestomyceticus. | C=30.8–30.57; H=7.00–6.44; N=7.19–7.38; S=8.99–9.08. Empirical formula: $C_{23}H_{45}N_5O_{14} \cdot 2.5 \cdot H_2SO_4 \cdot 2H_2O$. | +5 | By acid hydrolysis no formation of microbiologically active fragment. |
| Neomycin sulfate | Strept. fradiae. | $B_1$—C=29.35; H=6.86; N=9.21; $SO_4$=28.3 | B=+56 [2] | (a) By acid hydrolysis formation of active fragment (neamine). |
| | | $C_2$—C=31.18; H=6.14; N=8.93; S=9.90 | C=+82 [2] | (b) Infrared spectrum is different from that of F.I. 1600. (c) It is chromatographically different from F.I. 1600. |
| Streptomycin sulfate | Strept. griseus. | C=34.62; H=5.77; N=13.45; S=6.61 | −79° [3] | (a) Infrared spectrum is different from that of F.I. 1600. (b) It is chromatographically different from F.I. 1600. |
| Catenulin sulfate | Not described. | C=31.53, 31.58; H=5.29, 5.26; [4] N=7.92, 7.93; $SO_4$=28.11, 28.13. | +51.9 [4] | (a) Infrared absorption (not reported) is typical of a polypeptide spectrum. [4] (b) By acid hydrolysis formation of active fragment (neamine). [4] (c) It shows crossed resistance with neomycin. [6] |
| Kanamycin sulfate | Strept. kanamyceticus. | C=37.3, 37.4; H=6.8, 6.3; [5] N=9.3, 9.6; S=5.5 | +146° [5] | Infrared spectrum is different from that of F.I. 1600. |
| Hydroxymycin | Strept. paucisporogenes. | N=6.2. [7] Probable empirical formula reported [7] of the base: $C_{25}H_{47}N_5O_{15}$. | +51 [7] | Its pentabenzoate, soluble in 5 parts of hot methanol, melts at 233° C. with dec. and its ($\alpha$) is +36: These properties are different from those of F.I. 1600 pentabenzoate. The formula of the base is different from that of F.I. 1600. |
| Paromomycin sulfate | Strept. rimosus forma paromomysinus. | Probable empirical formula reported: [8] $(C_{10}H_{18-22}N_2O_8 \cdot H_2SO_4)_x$. | +50.5 [8] | Infrared spectrum is different from that of F.I. 1600 (absence of some absorption bands) and also the empirical formula is different. |

[1] Regna et al. J. Chem. Soc. 1950, p. 1045.
[2] Ford et al. J. Chem. Soc. 1955, p. 5311.
[3] Regna et al. J. Biol. Chem. 165, 1946, p. 621.
[4] Davisson et al. Antibiotic and Chem. 2, 1952, p. 460.
[5] Cron et al. J. Chem. Soc. 80, 1958, p. 752.
[6] Szybalsky et al. Am. Rev. Tuberc. 69, 1954, p. 267.
[7] G. Hagemann et al. Pharm. Franc. 16, 1958, p. 585.
[8] B.P. 797,568.

Therefore it has been put in evidence that F.I. 1600 provided by the present invention is a new member of the group of basic, water soluble oligosaccharide type antibiotics.

*Pharmacological properties.*—F.I. 1600 shows the following pharmacological properties:

(a) Broad antibiotic spectrum which comprises gram-positive, gram-negative and acid resistant bacteria.
(b) Inhibitory actions against the aforesaid organisms at very low concentration.
(c) Activity against antibiotic resistant strains.
(d) Very low toxicity.

Table IV shows the minimum dose in mcg./ml. (MID)

TABLE V

| Test organism | MID mcg./ml. liquid Dubos medium |
|---|---|
| M. tuberculosis H 37 Rv | 1 |
| M. tbc.—isoniazide res | 2.5 |
| Mycobacterium sp. AICC 607 | 2.5 |
| M. 607 strept. resistant | 2.5 |
| M. 607 chlortetracycl resistant | 2.5 |
| M. 607 oxytetracycl resistant | 2.5 |
| M. 607 neom. resistant | 5.0 |
| M. 607 viom. resistant | 2.5 |
| M. 607 oxam. resistant | 2.5 |
| M. 607 eritrom. resistant | 5.0 |
| M. 607 vancom. resistant | 5.0 |
| M. phlei | 0.98 |
| M. para-smegmatis | 0.124 |

Table VI shows the relative amounts in mcg./ml. (MID) of F.I. 1600 sulfate required to inhibit a number of representative organisms over different cultures.

TABLE VI

[In the table are reported the values of bacteriostatic and bactericidal concentrations of F.I.1600 in different culture media]

| Test organism | MID in mcg./ml. | | | |
|---|---|---|---|---|
| | Yeast broth | Nutrient broth | Penessay broth Difco | Brain heart infusion Difco |
| Bacteriostatic | | | | |
| Staphyl. aureus 114 | 0.35 | 0.6 | 1.6 | 3.8 |
| Staphyl. aureus 209 P | 0.62 | 1.05 | 4.0 | 12.0 |
| Staphyl. aureus 503 MB | 0.075 | 0.31 | 0.13 | 0.35 |
| Staphyl. aureus CAMP | | 0.15 | 1.45 | 4.8 |
| Staphyl. londres | 0.15 | 0.45 | 3.5 | 6.0 |
| Bactericidal after 24 hours | | | | |
| Staphyl. aureus 114 | 2.5 | 2.5 | 10 | >20 |
| Staphyl. aureus 209 P | 10 | 20 | 20 | >20 |
| Staphyl. aureus 503 MB | 0.3 | 1.25 | 20 | 5 |
| Staphyl. aureus CAMP | 5 | 20 | 5 | 10 |
| Staphyl. londres | 5 | 5 | 10 | 20 |
| Bactericidal after 48 hours | | | | |
| Staphyl. aureus 114 | 2.5 | 2.5 | 10 | >20 |
| Staphyl. aureus 209 P | 10.0 | 20 | 20 | >20 |
| Staphyl. aureus 503 MB | 0.3 | 1.25 | 20 | 5 |
| Staphyl. aureus CAMP | 5.0 | 20 | 5 | 10 |
| Staphyl. londres | 5 | 5 | 10 | 20 |

The following examples are given to illustrate the production and the recovery of F.I. 1600 by fermentation under submerged aerobic conditions. The same media may be used for fermentation in shaker flasks on a smaller scale or in tanks on a larger scale.

However the invention is not limited by the details set forth therein. It will be apparent to those skilled in the art that numerous modifications in materials and methods can be practised without departing from the spirit of the invention.

Example 1

300 ml. flasks containing 60 ml. of a medium having the following composition:

| | Percent |
|---|---|
| Soyabean flour | 2 |
| NaCl | 2.5 |
| Dextrose | 3 |
| Corn-steep | 1.5 |
| CaCO$_3$ | 0.7 | are sterilized at 120° C. for 20 minutes and inoculated each with 0.25 ml. of a suspension of spores of *S. krestomyceticus*.

The flasks are incubated at 28° C. on a shaking machine. A good growth is obtained within 7–8 days and about 500 mcg./ml. of antibiotic are produced.

Example 2

A spore suspension of *S. krestomyceticus* is inoculated into 2000 ml. Erlenmeyer flasks containing 500 ml. of a suitable medium which has the following composition:

| | Percent |
|---|---|
| Dextrin | 2 |
| Casein | 0.5 |
| CaCO$_3$ | 0.4 |
| MgSO$_4$ | 0.1 |
| (NH$_4$)$_2$SO$_4$ | 0.1 |
| ZnSO$_4$·7H$_2$O | 0.0002 |

After 48 hours of stirring at 28° C., 0.4% of the culture is transferred into a 10 liter tank containing the following medium:

| | Percent |
|---|---|
| Dextrin | 2 |
| Casein | 0.5 |
| CaCO$_3$ | 0.4 |
| (NH$_4$)$_2$SO$_4$ | 0.1 |
| K$_2$HPO$_4$ | 0.01 |
| Corn steep | 0.5 |

(pH after sterilization=6.6.)

After 7 hours of fermentation with stirring at 28° C. under aerobic conditions (1.1 l./m.) the culture has its maximum growth.

Example 3

A 2000 ml. flask containing 500 ml. of a medium having the following composition:

| | Percent |
|---|---|
| Casein hydrolysate | 1 |
| NaCl | 0.2 | is sterilized at 120° C. for 20 minutes and inoculated with a suspension of spores of *S. krestomyceticus* (cultivated on potato-agar medium). The flask is incubated at 28° C. for 48 hours with stirring.

After 48 hours the culture is transferred into a 100 liter tank containing the following medium:

| | Percent |
|---|---|
| Soyabean flour | 2 |
| Dextrin | 2.0 |
| CaCO$_3$ | 0.3 |

(pH=6.16.)

After 36 hours of fermentation with stirring at 28° C. under aerobic conditions, about 15% of the culture is transfered into a 1000 liter tank containing a medium of the following composition:

| | Percent |
|---|---|
| Soyabean flour | 2.5 |
| Dextrin | 2.5 |
| Distillers | 0.5 |
| NaCl | 0.25 |
| Soyabean oil | 0.03 |
| CaCO$_3$ | 0.03 |

(pH=6.4–6.5.)

The fermentation is continued for 80–90 hours at 28° C. with stirring and under aerobic conditions.

Example 4

To about 500 liters of fermentation broth is added with stirring oxalic acid (correspondent to Ca$^{++}$ contained in the broth), with subsequent adjustment of the pH to 7–7.5 with NaOH. The stirring is continued for 30 minutes and the suspension is filtered. The cake is washed with water.

The filtered solution is absorbed over 5 liters of IRC 50 (sodium phase).

By elution with 1 N HCl several separated fractions are obtained.

The active fractions are neutralized with anionic exchange resins (such as IRA 400 or IR 45) concentrated to dryness under vacuum and the residue is treated, 2–3 times, with 1 liter of methanol with stirring for 30 minutes. Each time the suspension is filtered. The F.I. 1600 hydrochloride is obtained by adding the methanolic solution to acetone (2–3 volumes); the white flocked product is filtered, washed with acetone and dried; yield=80–90 g.

Example 5

The F.I. 1600 hydrochloride is dissolved in water and the solution is filtered. The filtrate is concentrated to a small volume under vacuum, then triethylamine sulfate is added.

After cooling in a refrigerator, the isolated calcium sulfate is eliminated by filtration. The filtered solution is added to methanol with stirring. When the addition is finished, the stirring is continued for 30 minutes and the F.I. 1600 sulfate is filtered and washed with methanol.

The product is dried at 50° in vacuo over $P_2O_5$. The raw sulfate is purified by chromatography on carbon and celite and elution with diluted $H_2SO_4$, by forcing an aqueous solution of the sulfate through an anionic exchange resin in hydroxylate phase concentrating the effluent adding acetone, F.I. 1600 free base is obtained.

*Example 6*

1 g. of the sulfate dissolved in 50 ml. of water is treated with a slight excess of sodium p.hydroxy-phenyl-azo-benzene-sulfonate. The precipitated dye-salt is filtered and crystallized several times from hot water. This salt is suitable for preparing a highly purified sulfate in the following way:

The dye-salt, suspended in methanol, is treated with dried HCl. From the resulting solution hydrochloride is precipitated with acetone (yield: 0.6 g.). The sulfate is obtained by dissolving the hydrochloride in water and adding 3 ml. of triethylamine sulfate solution (containing 0.25 g. of $SO_4''$ per ml.). The product is collected on a filter, washed with acetone and dried. Yield: 0.65 g.., of highly purified F.I. 1600 sulfate. By analysis it contains 30.57% carbon, 6.44% hydrogen, 7.38% nitrogen and 9.08% sulfur. Infrared spectrum of F.I. 1600 sulfate in KBr (5%) shows strong absorption maxima at $2.94\mu$, $3.41\mu$, $6.15\mu$, $6.55\mu$, $9.00\mu$, $9.52\mu$, weak bands at $6.82\mu$, $7.08\mu$, $7.28\mu$, $7.46\mu$, $10.70\mu$, $11.17\mu$, $11.62\mu$, $13.08\mu$ and inflections at $3.09\mu$ and $10.23\mu$.

*Assay of F.I. 1600.*—A microbiological method of assay of F.I. 1600 is based on measurement of the inhibition zones around the agar wells containing solutions of various aerial dilutions of the antibiotic against agar medium seeded with *B. subtilis* ATCC 6633. An aqueous solution of F.I. 1600 sulfate is used.

*Toxicity*—toxicity per mouse:

LD 50 (intravenously administered) = 110 mg./kg.
LD 50 (subcutaneously administered) = 1.062 g./kg.
LD 50 (orally administered) = 25 g./kg.

Toxicity per dog: The administration of a dose of 20 mg./kg. (intravenously) to a healthy dog causes a slight, asthenic syndrome only.

Toxicity per rabbit: The administration of a dose of 2.5 mg. (intracisternal) shows no signs of toxicity.

Mice are found to survive injections of 200 mg./kg. (per day) for two months without ill effect.

Rats are not affected by subcutaneous injections of 200 mg./kg. (per day) for two months.

Cats receiving daily intramuscular injections of 50 mg./kg. show no neurotoxic symptoms.

*Example 7*

1.4 g. of F.I. 1600 sulfate and 6 g. of potassium bicarbonate are dissolved in 20 ml. of water. 3 ml. of benzoyl chloride are added to the above solution at 0° C. and the mixture is stirred for 1 hour at 0° C., then allowed to stand for a night between 0° and +5° C., and at last at room temperature for some minutes. The precipitate is filtered, washed with an aqueous solution of sodium bicarbonate, water and at last with ether. The product is crystallized from 40 parts of hot methanol. 0.34 g. of F.I. 1600 pentabenzoate, as white crystals melting at 208–211° C. without decomposition, are obtained. After several crystallizations from methanol, the M.P. does not rise above 208–211° C. By analysis it contains 60.60% carbon, 6.14% hydrogen, 6.05% nitrogen. It has the probable empirical formula $C_{58}H_{65}N_5O_{19} \cdot CH_3OH$ (calcd.: C, 60.66; H, 5.95; N, 6.01). $(\alpha)_D = +26° \pm 2$ (c.=0.3% in methanol).

*Example 8*

A suspension of 0.70 g. of F.I. 1600 in 30 ml. of methanol and 5 ml. of acetic anhydride is allowed to stand for a night at room temperature. Three volumes of acetone are added and the precipitate is dissolved in aqueous methanol and then precipitated with acetone. 0.31 g. of penta-acetate of F.I. 1600 are obtained as amorphous product melting at 198–204° C. $(\alpha)_D = +62.6° \pm 2$ (c.=1% in methanol).

By analysis it contains 43.23% carbon, 7.34% hydrogen and 7.45% nitrogen. It has the probable empirical formula $C_{33}H_{55}N_5O_{19} \cdot 5H_2O$ (calcd.: C, 43.27; H, 7.15; N, 7.65).

One mole of penta-acetyl-F.I. 1600, in 0.02 M. periodate solution, consumes 2.95 moles of periodate at room temperature (this consumption was reached after 18 hours and remains constant also after 42 hours).

*Example 9*

In a cultural broth containing 266 $\gamma$/ml. of the antibiotic F.I. 1600 (volume 4000 ml.; total content: 1.06 g.), the pH is adjusted to 8.5 and the mixture is stirred twice with 40 g. of carbon (Darco G 60) at room temperature for 1 hour.

The two filtered carbon cakes are stirred for 1 hour in 600 ml. of 50% aqueous solution adjusted to about pH 3 by adding aqueous HCl.

The mixture is filtered and the filtrate is neutralized with aqueous NaOH and concentrated to 210 ml. (containing 2100 $\gamma$/ml. of F.I. 1600). The solution is evaporated to dryness, the residue is treated with methanol and 3 volumes of acetone are added to the filtered methanolic solution. The product is filtered and dried. Yield: 1.06 g. containing 33% of antibiotic.

It will be understood from the data presented above that the antibiotic is to be applied in the fields of medicine, both human and veterinary, in which the organisms mentioned function as the causative agent of the malady. It will be further understood that the antibiotic, in its various forms, salts, and combinations, is to be applied for control of said organisms or like organisms as they effect any living organism, such as plant species.

We claim:

1. A process for producing an antibiotic substance, which comprises cultivating *Streptomyces krestomyceticus* N.C.I.B. 8995 and Commonwealth Mycological Institute No. 79589 in an aqueous nutrient medium containing a source of carbon, nitrogen and mineral salts under aerobic conditions until substantial anti-bacterial activity is imparted to the medium, and then recovering the antibiotic from the medium, said antibiotic having a broad spectrum of antibacterial activity against gram-positive and gram-negative, and particularly against staphylococci known to the resistant to other antibiotics, having a basic character, an empirical formula $C_{23}H_{45}N_5O_{14}$, giving a penta-acyl derivative by acylation, giving a sulfate which is a white powder soluble in water and insoluble in almost all organic solvents, the said sulfate having characteristic absorption in the infrared region when suspended in potassium bromide solution with pronounced peaks at the following wave lengths in $\mu$, 2.94, 3.41, 6.15, 6.55, 9.00 and 9.52, weak bands at 6.82, 7.08, 7.28, 7.46, 10.70, 11.17, 11.62 and 13.08 and inflections at 3.09 and 10.23, the optical rotation of 1% aqueous solution of the sulfate being $[\alpha]_D^{20} = +51°$, giving a hydrochloride containing 33.79% C., 6.76% H, 8.17% N and 21.05% Cl, which is a white powder insoluble in most organic solvents except methanol and has the optical rotation, in 1% aqueous solution, $[\alpha]_D^{25} = +55°$, giving a p(p-hydroxy-phenyl-azo)benzene-sulfonate containing 50.58% C, 5.25% H, 10.27% N and 7.72% S, and giving a helianthine salt containing 51.29% C, 6.20% H, 12.23% N and 7.50% S.

2. The process of claim 1, in which a heavy metal salt is present, the heavy metal being taken from the group consisting of copper, zinc, manganese, iron and chromium.

3. A process for producing an antibiotic substance F.I. 1600, defined as in claim 1, which comprises cultivating Streptomyces krestomyceticus N.C.I.B. 8995 and Commonwealth Mycological Institute No. 79589 in an aqueous nutrient medium containing a source of carbon, nitrogen and mineral salts under aerobic conditions until substantial anti-bacterial activity is imparted to the medium, said cultivation being carried out at a temperature of 24° to 32° C. for a period of two days to one week at a pH of 6.3 to 7.8, and then recovering the antibiotic from the medium, said antibiotic having a broad spectrum of anti-bacterial activity against gram-positive and gram-negative, and particularly against staphylococci known to be resistant to other antibiotics, having a basic character, an empirical formula $C_{23}H_{45}N_5O_{14}$, giving a penta-acyl derivative by acylation, giving a sulfate which is a white powder soluble in water and insoluble in almost all organic solvents, the said sulfate having characteristic absorption in the infrared region when suspended in potassium bromide solution with pronounced peaks at the following wave lengths in $\mu$, 2.94, 3.41, 6.15, 6.55, 9.00 and 9.52, weak bands at 6.82, 7.08, 7.28, 7.46, 10.70, 11.17, 11.62 and 13.08 and inflections at 3.09 and 10.23, the optical rotation of 1% aqueous solution of the sulfate being $[\alpha]_D^{20}=+51°$, giving a hydrochloride containing 33.79% C, 6.76% H, 8.17% N and 21.05% Cl, which is a white powder insoluble in most organic solvents except methanol and has the optical rotation, in 1% aqueous solution, $[\alpha]_D^{25}=+55°$, giving a p(p-hydroxy-phenylazo)benzene-sulfonate containing 50.58% C, 5.25% H, 10.27% N and 7.72% S, and giving a helianthine salt containing 51.29% C, 6.20% H, 12.23 N and 7.50% S.

4. A process for producing an antibiotic substance, which comprises cultivating Streptomyces krestomyceticus N.C.I.B. 8995 and Commonwealth Mycological Institute No. 79589 in an aqueous nutrient medium containing a source of carbon, nitrogen and mineral salts under aerobic conditions until substantial anti-bacterial activity is imparted to the medium, said cultivation being carried out at a temperature of about 24° to 32° C. for a period of about two days to one week at an initial pH of about 6.4 to 6.7 and a final pH of from 7.6 to 7.8, and then recovering the antibiotic from the medium, said antibiotic having a broad spectrum of antibacterial activity against gram-positive and gram-negative, and particularly against staphylococci known to be resistant to other antibiotics, having a basic character, an empirical formula $C_{23}H_{45}N_5O_{14}$, giving a penta-acyl derivative by acylation, giving a sulfate which is a white powder soluble in water and insoluble in almost all organic solvents, the said sulfate having characteristic absorption in the infrared region when suspended in potassium bromide solution with pronounced peaks at the following wave lengths in $\mu$, 2.94, 3.41, 6.15, 6.55, 9.00 and 9.52, weak bands at 6.82, 7.08, 7.28, 7.46, 10.70, 11.17, 11.62 and 13.08 and inflections at 3.09 and 10.23, the optical rotation of 1% aqueous solution of the sulfate being $[\alpha]_D^{20}=+51°$, giving a hydrochloride containing 33.79% C, 6.76% H, 8.17% N and 21.05% Cl, which is a white powder insoluble in most organic solvents except methanol and has the optical rotation, in 1% aqueous solution, $[\alpha]_D^{25}=+55°$, giving a p(p-hydroxy-phenylazo)benzene-sulfonate containing 50.58% C, 5.25% H, 10.27% N and 7.72% S, and giving a helianthine salt containing 51.29% C, 6.20% H, 12.23% N and 7.50 S.

5. The process of claim 1 in which the cultivation is carried out by submerged fermentation with aeration and agitation of the medium, the volume proportions of air introduced, with respect to the volume of the culture liquid, being between 0.1 and 0.8.

6. The process of claim 1, the antibiotic being absorbed on carbon at a pH above 7, and eluted with an acid.

7. A process for producing the hydrochloride of an antibiotic substance F.I. 1600, which comprises cultivating Streptomyces krestomyceticus N.C.I.B. 8995 and Commonwealth Mycological Institute No. 79589 in an aqueous nutrient medium containing a source of carbon, nitrogen and mineral salts under aerobic conditions until substantial anti-bacterial activity is imparted to the medium, and then recovering the antibiotic content from the medium after adjusting the pH to 7-7.5 by separating the mycelium, absorbing the antibiotic on a cationic exchange resin, eluting with aqueous diluted hydrochloric acid, neutralizing with an anionic exchange resin, separating the solution, concentrating the solution to dryness, dissolution of the residue in methanol, and precipitating the F.I. 1600 hydrochloride by adding acetone, said antibiotic having a broad spectrum of antibacterial activity against gram-positive and gram-negative, and particularly against staphylococci known to be resistant to other antibiotics, having a basic character, an empirical formula $C_{23}H_{45}N_5O_{14}$, giving a penta-acyl derivative by acylation, giving a sulfate which is a white powder soluble in water and insoluble in almost all organic solvents, the said sulfate having characteristic absorption in the infrared region when suspended in potassium bromide solution with pronounced peaks at the following wave lengths in $\mu$, 2.94, 3.41, 6.15, 6.55, 9.00 and 9.52, weak bands at 6.82, 7.08, 7.28, 7.46, 10.70, 11.17, 11.62 and 13.08 and inflections at 3.09 and 10.23, the optical rotation of 1% aqueous solution of the sulfate being $[\alpha]_D^{20}=+51°$, giving a hydrochloride containing 33.79% C, 6.76% H, 8.17% N and 21.05% Cl, which is a white powder insoluble in most organic solvents except methanol and has the optical rotation, in 1% aqueous solution, $[\alpha]_D^{25}=+55°$, giving a p(p-hydroxy-phenylazo)benzene - sulfonate containing 50.58% C, 5.25% H, 10.27% N and 7.72% S, and giving a helianthine salt containing 51.29% C, 6.20% H, 12.23% N and 7.50 S.

8. The process of claim 7, and treating the hydrochloride with triethylamine sulfate in water, to obtain the antibiotic sulfate by adding methanol.

9. The process of claim 8, and forcing an aqueous solution of the antibiotic sulfate through an anionic exchange resin, in hydroxylate phase, concentrating the effluent and adding acetone, to obtain the antibiotic free base.

10. A process for producing an antibiotic substance, which comprises cultivating Streptomyces krestomyceticus N.C.I.B. 8995 and Commonwealth Mycological Institute No. 79589 in an aqueous nutrient medium containing a source of carbon, nitrogen and mineral salts under aerobic conditions until substantial antibacterial activity is imparted to the medium, and then recovering F.I. 1600 from the medium, by separating the mycelium, adjusting the pH to about 8.5, absorbing the antibiotic on a solid adsorbent, eluting with an acid, and neutralizing the free acid by adjusting the pH to 7-7.5, to obtain an acid addition salt of said antibiotic, said antibiotic having a broad spectrum of antibacterial activity against gram-positive and gram-negative, and particularly against staphylococci known to be resistant to other antibiotics, having a basic character, an empirical formula $C_{23}H_{45}N_5O_{14}$, giving a penta-acyl derivative by acylation, giving a sulfate which is a white powder soluble in water and insoluble in almost all organic solvents, the said sulfate having characteristic absorption in the infrared region when suspended in potassium bromide solution with pronounced peaks at the following wave lengths in $\mu$, 2.94, 3.41, 6.15, 6.55, 9.00 and 9.52, weak bands at 6.82, 7.08, 7.28, 7.46, 10.70, 11.17, 11.62 and 13.08 and inflections at 3.09 and 10.23, the optical rotation of 1% aqueous solution of the sulfate being $[\alpha]_D^{20}=+51°$, giving a hydrochloride containing 33.79% C, 6.76% H, 8.17% N and 21.05% Cl, which is a white powder insoluble in most organic solvents except methanol and has the optical rotation, in 1% aqueous solution, $[\alpha]_D^{25}=+55°$, giving a p(p-hydroxy-phenylazo)benzene-sulfonate containing 50.58% C, 5.25% H, 10.27% N and 7.72% S, and giving a helianthine salt containing 51.29% C, 6.20% H, 12.23% N and 7.50% S.

11. The process of claim 7, and forcing an aqueous solution of the antibiotic hydrochloride through an anionic exchange resin, in hydroxylate phase, concentrating the effluent and adding acetone, to obtain the antibiotic free base.

References Cited in the file of this patent

FOREIGN PATENTS 215,467     Australia _____ May 28, 1958

OTHER REFERENCES

Pridham et al.: Applied Microbiology, January 1958, pp. 52–79, (pp. 53–55 and 66 are especially pertinent).